UNITED STATES PATENT OFFICE.

JOHN THOMAS DAVIS, OF SAN FRANCISCO, CALIFORNIA, ASSIGNOR OF ONE-HALF TO CHARLES W. KOHLSAAT, OF NEW YORK, N. Y.

ARTIFICIAL FUEL.

SPECIFICATION forming part of Letters Patent No. 619,729, dated February 21, 1899.

Application filed February 10, 1898. Serial No. 669,798. (No specimens.)

*To all whom it may concern:*

Be it known that I, JOHN THOMAS DAVIS, a citizen of the United States, residing at San Francisco, in the county of San Francisco and State of California, have invented certain new and useful Improvements in Artificial Fuel; and I do hereby declare the following to be a full, clear, and exact description of the invention, such as will enable others skilled in the art to which it appertains to make and use the same.

This invention relates to the briqueting of fuel and other finely-divided matter.

The object is in a ready and efficient manner to present, even with a form of coal of the Pacific Coast heretofore very difficult of agglomeration, an agglomerate fuel, as in the form of a briquet, which shall be free-burning, which shall be non-hygroscopic and not injuriously affected by exposure to or even immersion in water, and which shall hold together with great tenacity under all conditions of handling and of transportation.

The object is also to present various matter to be treated by subjection to heat in the form of firm and practical briquets or blocks for the purpose.

With these objects in view the invention consists in the method of making an agglomerate substance by mixing with suitable finely-divided matter—such as coal, iron ores, lead or copper oxids or sulfids, dust from the stacks of refining-furnaces, cast-iron turnings or borings, &c., and with or without lime—saccharine matter, a solution of gelatin, and a solution of bichromate of potash—*i. e.*, potassium bichromate—or other gelatin-chromatizing agent having the effect of rendering the gelatin practically insoluble in water.

The invention also consists in the product produced.

In carrying out my invention I vary the proportions, as well as the ingredients, to suit the character of the material or the purpose to be attained.

To carry my invention into effect for the binding of coal-dust and the forming of the same into briquets, I thoroughly mix with finely-divided coal saccharine matter, a solution of gelatin, and a solution of bichromate of potash or other gelatin-chromatizing agent.

The proportions which I prefer are to every one hundred per cent. of coal three per cent. of saccharine matter, such as the refuse from beet-sugar works, and about three per cent. of gelatin in solution of the strength of one part of gelatin to two parts of water, and about one-half of one per cent. of potassium bichromate in solution of one pound to one gallon of water, and the specific procedure which I prefer is to mix the gelatin solution and saccharine matter together under heat—say from 150° to 200° Fahrenheit—to bring the solution of potassium bichromate to the boiling-point, then to mix it with the gelatin and saccharine matter, stirring the mixture for ten or fifteen minutes, and then allowing the entire mixture to remain, say, at about 120° Fahrenheit for some twenty minutes, more or less, and then to incorporate the whole thoroughly with the coal, sufficiently dried to rid it of superfluous moisture, the mass thereupon being suitably divided into blocks or briquets of desirable size, which are then subjected to exposure to the air to harden.

In some cases where the coal is very refractory to agglomeration I may add lime to the binding mixture or to the coal before mixing. Where I employ lime, I prefer to slake it first with just enough boiling-hot water or with a hot solution of sulfate of iron to reduce it to a powder and then sift it to make it very fine, and of this prepared lime I use about three per cent., more or less, according to the nature of the coal.

The agglomerate fuel thus made is of great tenacity, even where a coal of highly refractory disposition toward agglomeration, such as some of the coals of the Pacific Coast, is employed, and the resultant fuel is non-hygroscopic, will stand long-continued subjection to moisture, even immersion in water, will remain unbroken in handling and in transportation, stands up perfectly in burning, and burns freely and completely.

In briqueting iron ore after it is reduced to the desired fineness and separated from the gangue by mechanical means I use the same composition as above described, with the addition of lime, the lime having been previously slaked with just enough boiling-hot water to reduce it to a powder and sifted or otherwise made very fine, and of this prepared lime I use from three to six per cent., according to the character of the ore to be worked. After a thorough incorporation the mass is pressed into briquets and thoroughly dried before being put into the furnace.

In the use of the process for treating oxids of lead or copper or the sulfids the proportion of lime is increased in proportion to amount of carbon or sulfur present, say up to ten per cent.

The same rules will hold good as to proportions for the dust of the stacks from the refineries, the proportions varying with the greater or less amount of sulfur or carbon present, the step of drying before using being an essential feature.

The same formula is applicable to the briqueting of iron-turnings from the machine-shops, manganese ore, or chrome-iron sand.

Having thus described my invention, what I claim, and desire to secure by Letters Patent, is—

1. The process of making an agglomerate fuel, which consists in preparing a solution of gelatin and saccharine matter and a solution of a gelatin-chromatizing agent, and mixing these with finely-divided coal.

2. The process of making an agglomerate fuel, which consists in preparing a solution of gelatin and saccharine matter by heating a solution of gelatin with saccharine matter, then heating a solution of bichromate of potash, and then mixing the solutions with finely-divided coal.

3. The process of making an agglomerate fuel, which consists in mixing together, under heat, a solution of gelatin and saccharine matter, heating an aqueous solution of bichromate of potash, mixing the bichromate solution with the gelatin and saccharine matter, allowing the mixture to remain for twenty minutes, somewhat more or less, at about 120° Fahrenheit, somewhat more or less, and then incorporating the entire mixture with finely-divided coal, substantially as described.

4. The process of making an agglomerate fuel, which consists in taking, to every one hundred pounds of finely-divided coal, three to five pounds of saccharine matter, three to five pounds of gelatin, in solution of one part of gelatin to two parts of water, and mixing the saccharine matter with the gelatin solution under heat, then taking about one-half pound of potassium bichromate in solution of about one-half gallon of water, heating the latter solution and then mixing the solutions with the coal, substantially as described.

5. An agglomerate mass consisting of a suitable substance, such as described, in a state of fine division, held together by a bond containing saccharine matter and chromatized gelatin, substantially as described and for the purpose set forth.

6. An agglomerate mass consisting of a suitable substance, such as described, in a state of fine division, saccharine matter, chromatized gelatin, and lime, substantially as described.

In testimony whereof I have affixed my signature in the presence of two witnesses.

JOHN THOMAS DAVIS.

Witnesses:
LEE D. CRAIG,
WALTER R. CRAIG.